Patented Aug. 25, 1953

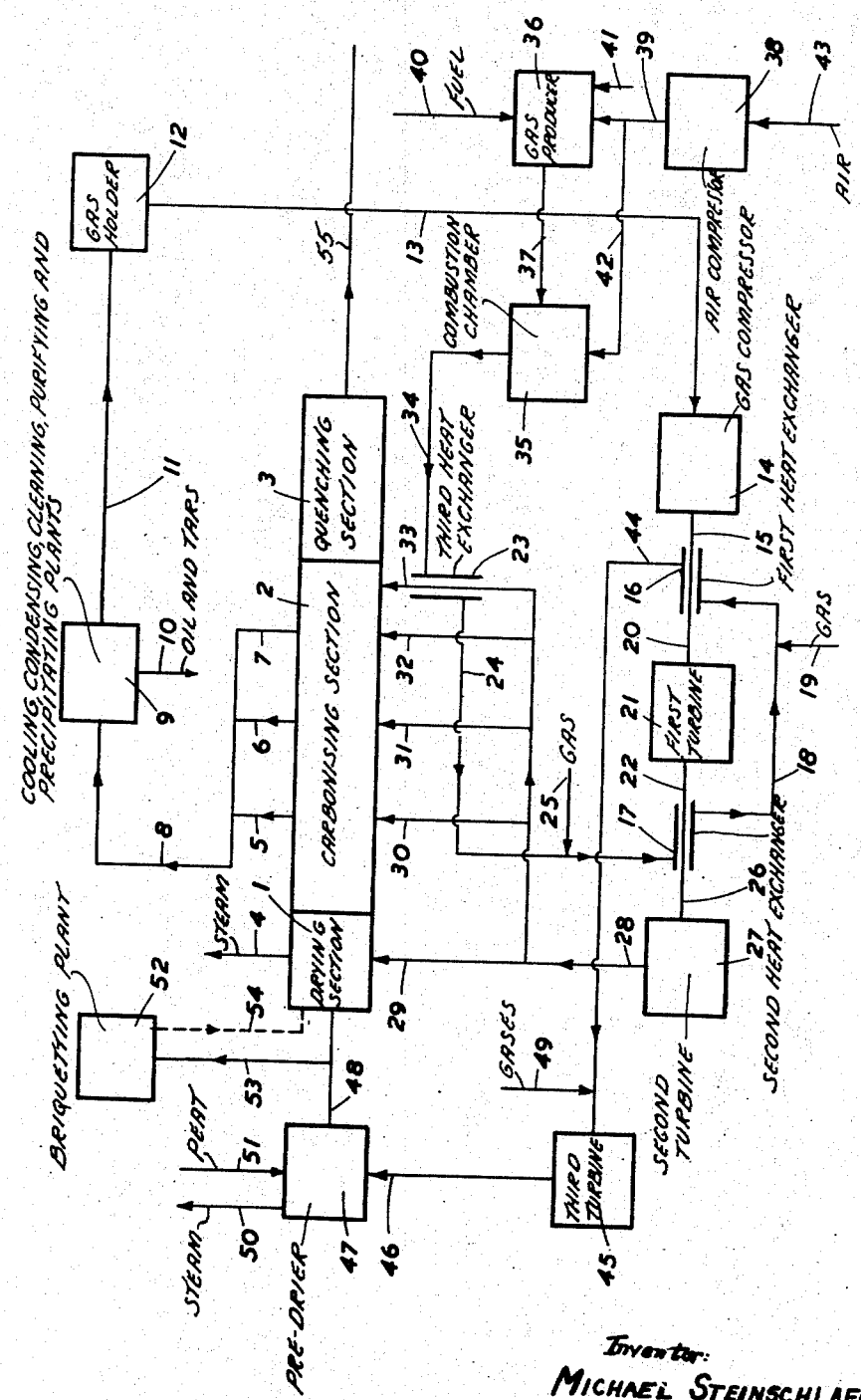

2,650,190

UNITED STATES PATENT OFFICE 2,650,190

CARBONIZATION OF PEAT WITH THE UTILIZATION OF EXCESS HEAT TO PRODUCE SURPLUS POWER

Michael Steinschlaeger, London, England

Application June 5, 1950, Serial No. 166,235
In Great Britain June 21, 1949

5 Claims. (Cl. 202—30)

This invention relates to the carbonisation of solid fuels.

In the carbonisation of solid fuels, such as peat, lignite, cannel coals, bituminous coals, shale and wood, the economics of the process and plant are substantially influenced by the heat required to dry and carbonise the fuel. This applies to processes which use the sensible heat of gases or vapours to accomplish the drying and carbonisation as well as to processes which use heating gases indirectly to heat retorts and dry and carbonise the fuel.

It is an object of the present invention to produce large quantities of cheap hot gases and vapours and to utilise these to dry and carbonise the fuels, and at the same time, besides obtaining the usual products of carbonisation, to obtain a large surplus of cheap power and so to improve considerably the economics of the carbonisation, or still more to permit of the drying and carbonisation of some of the fuels which hitherto it has not been possible to dry and carbonise economically in view of the cost of the process and raw materials and the capital expenditure for the plant.

The process of the present invention for the carbonisation of solid fuels comprises introducing the fuel to be carbonised into a carbonisation plant, which contains drying, carbonising and cooling or quenching zones through which the fuel passes in succession, removing gases and vapours from a plurality of outlets in the carbonising zone, separating oils and tars from the gases, compressing the gases, heating the compressed gases in a heat exchanger, passing the heated compressed gases through a first turbine, heating the exhaust gases from the first turbine in a second heat exchanger, passing the heated gases through a second turbine and passing the exhaust gases from the second turbine into the drying zone and the carbonising zone of the carbonisation plant, burning gas from a producer or generator in a combustion chamber, utilising a part of the sensible heat of the combustion gases to effect heating of the gases passing into the carbonising zone of the carbonisation plant from the second turbine by heat exchange, then passing said combustion gases through said second heat exchanger and said first heat exchanger in sequence and, if desired, passing said gases through a third turbine and utilising the exhaust gases from said third turbine to effect pre-drying of the fuel to be dried and carbonised.

The producer or generator may be operated under pressure if desired and hot gases or vapours may be bled off at any stage of the process whilst gases and vapours may be added at any stage of the process if required.

The invention also includes an apparatus for the carbonisation of solid fuels which comprises a carbonisation plant comprising a drying section, a carbonising section (for example a tunnel kiln) and a cooling or quenching section, conduits for introducing gas into the drying section and the carbonising section at a plurality of points, a plurality of conduits for removing gas and vapours from the carbonising section connected to a condenser or washer for removing oils and tars connected in turn to a gas holder and a gas compressor which is connected to two turbines in series, said second turbine being connected with the inlet conduits for the carbonisation plant, a heat exchanger between the gas compressor and the first turbine, a second heat exchanger between the first and second turbines, a gas producer or generator, an air compressor to supply compressed air to the producer or generator, an outlet from the producer or generator connected to a combustion chamber connected to one or more heat exchangers adapted to heat the inlet conduits of the carbonisation plant, the said heat exchanger or heat exchangers being connected in series to said second and said first heat exchangers and, if desired, a connection from the said first heat exchanger to a third turbine and to a pre-drier.

The invention is particularly applicable to the treatment of low-grade fuels containing high percentages of water, such as peat, and an embodiment of the invention will now be described by way of example with particular reference to the treatment of peat and with reference to the accompanying drawing which is a diagrammatic representation of a plant according to the invention.

Referring to the drawing, a carbonisation plant such as a tunnel kiln is used. The kiln consists of three sections, namely, a drying section 1, a carbonising section 2 and a quenching section 3. For the carbonisation the sensible heat of gases is used. As a rule the gas generated in the process is used in several turbines and heat exchangers to be heated and re-cycled to the kiln at a plurality of inlets. In the drying section steam obtained in the drying is re-cycled and heated before entering the drying section (as hereinafter described). If desired, before using the steam for the generation of power it may be freed from dust, grit and the The gases leaving the carbonising section (consisting of the gases and vapours generated from the fuel and the re-cycled gases used for carbonisation) at a plurality of points or outlets by pipes 5, 6 and 7 and manifold 8 are brought into the cooling, condensation, cleansing, purifying and precipitation plants diagrammatically represented by 9, where the oil and tars and any other constituents which it is desirable to obtain are separated from the gases and removed by pipe 10. The gases are then passed through pipe 11 into a gas holder 12. The gases from the gas holder are passed through pipe 13 to a gas compressor 14 in which they are compressed. From the gas compressor the gases pass through a pipe 15 to a first heat exchanger 16 which is heated by gases leaving a second heat exchanger 17 through a pipe 18. Additional gas may be admitted, if desired, through pipe 19. After leaving the first heat exchanger 16 by pipe 20 the gases pass through a first turbine 21 in which they partly expand and generate power, and they then pass by a pipe 22 into the second heat exchanger 17, which is heated by gas coming from a third heat exchanger 23 through pipe 24. Additional gas may be admitted, if desired, through pipe 25. The gases, after being heated in the second heat exchanger 17, are passed by a pipe 26 to a second turbine 27 in which they expand partly and generate power. The gases leaving the second turbine 27 by pipe 28 pass by pipes 29, 30, 31, 32 and 33 to the drying and carbonising sections of the kiln, where they are introduced at a plurality of points along the kiln. The part of the gases passing through pipe 33 is pre-heated in the third heat exchanger 23 by gases coming by pipe 34 from a combustion chamber 35. The combustion gases are obtained from gases produced or generated in the producer 36 under pressure supplied through pipe 37 and burnt by admixture of air under pressure supplied from an air compressor 38 by pipe 39. The producer is supplied with solid fuel, oil or tar by the inlet 40 and steam or carbon dioxide is admitted through pipe 41. The air for the producer is also obtained by pipe 39 from the air compressor 38 which has an inlet pipe 43. The combustion gases under pressure leaving the first heat exchanger through pipe 44 are introduced into the third turbine 45 (and, if desired, through a further heat exchanger and turbine not shown in the drawing) and the gases leaving the third turbine by pipe 46 are introduced into a pre-drier 47 connected with the drying section 1 of the tunnel kiln by pipe 48. Gases, vapours, combustion gases and air may be introduced at different stages in the plant if required or desirable, for example through pipe 49. Furthermore, steam under pressure may be removed from the pre-drier 47 through pipe 50 if desired.

The passage of the peat through the plant is as follows:

Wet peat is introduced through the inlet 51 into the pre-drier 47. The peat leaving the pre-drier goes partly to a briquetting plant 52 by pipe 53 and partly through the carbonisation plant, or the whole of the dried or pre-dried plant, or the whole of the dried or pre-dried peat goes to a briquetting plant and thence to the carbonisation plant through pipe 54, first to the drying section and from this section to the carbonising section and thence through the cooling or quenching section. The carbonised fuel leaving the cooling or quenching section by pipe 55 may be screened before being despatched to the consumer, or may be used in the producer to generate gases. The smalls may be used in the briquetting plant if desired, where they can be briquetted separately or mixed with dried peat or raw peat.

While the invention has been more particularly described with reference to peat, it will be understood that other fuels may be treated and, if desired, the fuels may undergo an extraction process before being carbonised after they have been dried to some extent. The waste gases from the turbines with or without further pre-heating may be used in the plant. The fuel used in the producer may be solid fuel obtained in the process or any other fuel, preferably low-grade fuel. Tar and oils may be used, if desired, and if these are used the tar or oil may be vaporised or gasified, using carrier gases. If solid fuel is used in the producer this may be used in the form of a static bed, or powdered fuel may be used and moved like a fluid in the producer.

In the appended claims the term "quenching" includes "cooling" and the term "gas producer" includes "gas generator."

What I claim is:

1. A process for the carbonisation of solid fuels which comprises passing the fuel to be carbonised in succession through drying, carbonising and quenching zones in a carbonisation plant, removing gases and vapours from a plurality of outlets in the carbonising zone, separating oils and tars from said gases, compressing the thus treated gases, heating the compressed gases in a heat exchanger, passing the heated compressed gases through a first turbine, heating the exhaust gases from the first turbine in a second heat exchanger, passing the heated gases through a second turbine and splitting the exhaust gases from the second turbine into a plurality of streams, passing at least one of said streams through said drying zone and passing at least one other of said streams through said carbonising zone, burning a combustible gas, utilising a part of the sensible heat of the combustion gases thus produced to effect heating of the gases passing into said carbonising zone from said second turbine by heat exchange, then passing said combustion gases through said second heat exchanger and said first heat exchanger in sequence.

2. A process for the carbonisation of solid fuels which comprises passing the fuel to be carbonised in succession through drying, carbonising and quenching zones in a carbonisation plant, removing gases and vapours from a plurality of outlets in the carbonising zone, separating oils and tars from said gases, compressing the thus treated gases, heating the compressed gases in a heat exchanger, passing the heated compressed gases through a first turbine, heating the exhaust gases from the first turbine in a second heat exchanger, passing the heated gases through a second turbine and splitting the exhaust gases from the second turbine into a plurality of streams, passing at least one of said streams through said drying zone and passing at least one other of said streams through said carbonising zone, burning a combustible gas, utilising a part of the sensible heat of the combustion gases thus produced to effect heating of the gases passing into said carbonising zone from said second turbine by heat exchange, then passing said combustion gases through said second heat exchanger and said first heat exchanger in sequence, passing the combustion gases leaving said first heat exchanger through a third turbine and pre-drying the fuel to be carbonised by treatment with the exhaust gases from said third turbine.

3. A process for the carbonisation of peat which comprises passing the peat to be carbonised in succession through drying, carbonising and quenching zones in a carbonisation plant, removing gases and vapours from a plurality of outlets in the carbonising zone, separating oils and tars from said gases, compressing the thus treated gases, heating the compressed gases in a heat exchanger, passing the heated compressed gases through a first turbine, heating the exhaust gases from the first turbine in a second heat exchanger, passing the heated gases through a second turbine and splitting the exhaust gases from the second turbine into a plurality of streams, passing at least one of said streams through said drying zone and passing at least one other of said streams through said carbonising zone, burning a combustible gase, utilising a part of the sensible heat of the combustion gases thus produced to effect heating of the gases passing into said carbonising zone from said second turbine by heat exchange, then passing said combustion gases through said second heat exchanger and said first heat exchanger in sequence.

4. An apparatus for the carbonisation of solid fuels which comprises a carbonisation plant comprising a drying section, a carbonising section and a quenching section, inlet conduits for introducing gas into the drying section and the carbonising section at a plurality of points, a plurality of outlet conduits for removing gases and vapours from the carbonising section, a condenser for removing oils and tars connected to said outlet conduits, a gas holder connected to said condenser, a gas compressor connected to said gas holder, two turbines disposed in series, the first being connected to said compressor and the second to said inlet conduits of said carbonisation plant, a heat exchanger between the gas compressor and the first turbine, a second heat exchanger between the first and second turbines, a gas producer, an air compressor connected to said gas producer, a combustion chamber connected to said producer and a third heat exchanger adapted to heat the inlet conduits of the carbonisation plant, said third heat exchanger being connected to said combustion chamber and also connected in series to said second and first heat exchangers.

5. An apparatus for the carbonisation of solid fuels which comprises a carbonisation plant comprising a drying section, a carbonising section and a quenching section, inlet conduits for introducing gas into the drying section and the carbonising section at a plurality of points, a plurality of outlet conduits for removing gases and vapours from the carbonising section, a condenser for removing oils and tars connected to said outlet conduits, a gas holder connected to said condenser, a gas compressor connected to said gas holder, two turbines disposed in series, the first being connected to said compressor and the second to said inlet conduits of said carbonisation plant, a heat exchanger between the gas compressor and the first turbine, a second heat exchanger between the first and second turbines, a gas producer, an air compressor connected to said gas producer, a combustion chamber connected to said producer, a third heat exchanger adapted to heat the inlet conduits of the carbonisation plant, said third heat exchanger being connected to said combustion chamber and also connected in series to said second and first heat exchangers, a third turbine and a pre-drier, said third turbine being connected to said first heat exchanger and to said pre-drier.

MICHAEL STEINSCHLAEGER.

References Cited in the file of this patent

UNITED STATES PATENTS

| Number | Name | Date |
|---|---|---|
| 1,089,055 | Holzwarth | Mar. 3, 1914 |
| 1,301,960 | Michie et al. | Apr. 29, 1919 |
| 1,586,130 | Trumble | May 25, 1926 |
| 1,615,003 | Bottomly et al. | Jan. 18, 1927 |
| 1,658,910 | Trumble | Feb. 14, 1928 |
| 1,667,403 | Trumble | Apr. 24, 1928 |
| 2,095,991 | Lysholm | Oct. 19, 1937 |
| 2,190,293 | Malkomes | Feb. 13, 1940 |
| 2,280,765 | Anxionnaz et al. | Apr. 21, 1942 |
| 2,406,509 | Pilo | Aug. 27, 1946 |
| 2,448,223 | Lantz | Aug. 31, 1948 |